Patented Sept. 30, 1924.

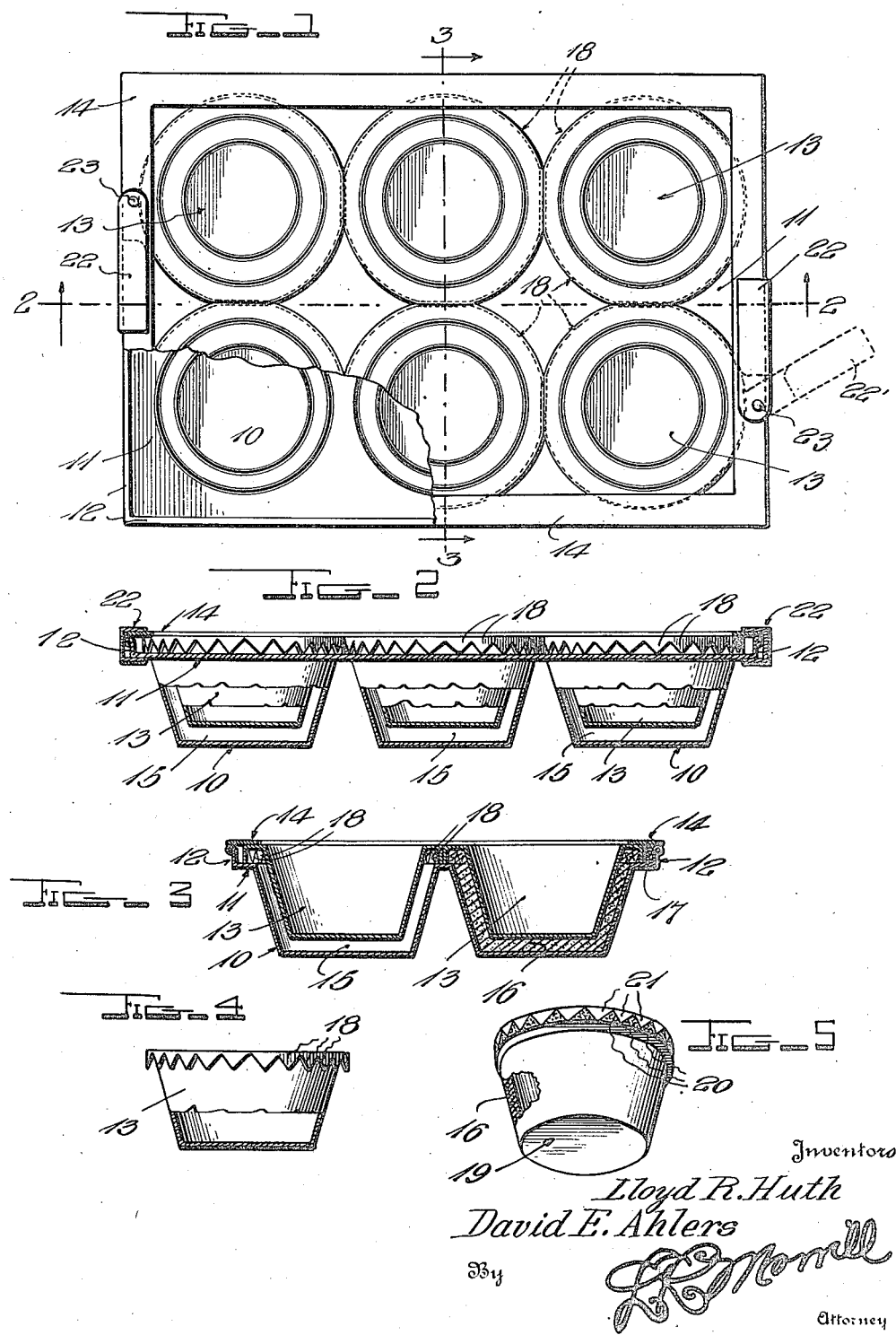

1,510,279

UNITED STATES PATENT OFFICE.

LLOYD R. HUTH AND DAVID E. AHLERS, OF CARLISLE, PENNSYLVANIA, ASSIGNORS OF ONE-THIRD TO EMMETT R. WOODS, OF CARLISLE, PENNSYLVANIA.

BAKE PAN.

Application filed September 11, 1923. Serial No. 662,117.

*To all whom it may concern:*

Be it known that we, LLOYD R. HUTH and DAVID E. AHLERS, citizens of the United States, residing at Carlisle, in the county of Cumberland and State of Pennsylvania, have invented certain new and useful Improvements in Bake Pans, of which the following is a specification.

This invention relates to baking pans and has for an object to provide a baking pan having new and improved features and means for the baking of a loaf in the form of a cup or hollow container of leavened dough or batter, providing a special means for caring for the excess which runs over from the chamber filled by the expansion of such leavened mass.

A further object of the invention is to provide improved means facilitating the removal of the excess mass which runs over from the filled and completed form without breaking the loaf itself.

With these and other objects in view, the invention comprises certain novel parts, elements, units, combinations, arrangements, interactions and functions, as disclosed in the drawings together with mechanical and functional equivalents thereof, as will be hereinafter more fully described and claimed.

In the drawings:

Figure 1 is a top plan view of the bake pan.

Figure 2 is a longitudinal sectional view of the pan taken on line 2—2 of Figure 1.

Figure 3 is a transverse sectional view taken on line 3—3 of Figure 1.

Figure 4 is a view partly in side elevation and partly in section of one of the ends of the core of the pan removed.

Figure 5 is a view in perspective of the baked loaf.

Like characters of reference indicate corresponding parts throughout the several views.

The present invention is intended especially for baking a loaf of leavened dough or batter in the form of a hollow receptacle which is later to be filled with some material and eaten as an entirety. It is well known that in the vending of such materials as ice cream, containers are now provided which are eaten with the confection or forming in fact a part of the confection. As at present practiced, however, these containers are mostly intended for being held in the hand of the consumer and by the nature of their construction are composed of unleavened dough or batter. It is also well known that a combination of a leavened, sweetened, flavored confection with such material as ice cream, fruits, meringue or the like, forms a dainty and palatable article and it is, therefore, an object of the present invention to provide means for baking a loaf of leavened and otherwise treated material in the form of a container for the purpose mentioned.

With this object in view, the invention comprises a plurality of pan units 10 which are connected together in any usual and ordinary manner, as by a plate-like member 11 to which all of said units are attached by any usual and ordinary means and, when so constructed, resembles in its general appearance the pan at present known as a "gem" pan, or the like.

The pan, however, comprises in addition to the pan plate 11 an up-turned marginal flange 12 entirely around the margin of the plate 11 for a purpose which will be more clearly understood by the hereinafter explanation of the functioning of the device.

Co-acting with the pan composed of the units 10 and plate 11 is a second structure composed of a like number of units 13 corresponding generally in shape to the pans 10. These several units 13 are secured together in any approved manner with a marginal frame 14 of such proportion as to bear upon the top of the flange 12. In this position, the relation of the parts is such that the units 13 are spaced away from the units 10 forming an interval 15 which will be filled with dough, batter or other material to be baked into a loaf, as indicated at 16.

As hereinbefore explained, it is the object of the present invention to employ a leavened dough, batter or the like which in the heating will expand and, to insure the complete filling of the mold, a quantity will run over, as indicated at 17 in Figure 3. This run-over part will form an irregular flange about the edge of the completed loaf which must be broken away and for this purpose the edge of the unit 13 is turned down and serrated as indicated at 18, so that the run over part of the material will exude between these serrations and, when baked, will provide a perforation by reason of the inserted points of the serration. This will produce a loaf, as indicated at 19 in Figure 5, the parts 20 indicating the portions from which the run over part has been broken, the parts 21 indicating those portions into which the serrations 18 were impaled in the baking. This will insure the making of a uniform cup-shaped loaf and the breaking of the run over at the edges, as indicated at Figure 5, will produce a fanciful design about the upper margin of the loaf.

To insure the proper positioning of the upper and lower units, clamps 22 are provided pivoted to one member as the upper member at 23 to swing outwardly to the position at 22', as indicated at Figure 1, to release the organizations from each other, whereby the upper organization may be removed from the baked loaves contained and remaining in the lower organization, which may then be inverted and the contents of the unit pans 10 discharged.

What we claim to be new is:

1. A bake pan comprising a hollow receptacle having an outwardly extending, upwardly turned flange, and an inner core member spaced from the first mentioned container having a downwardly extending serrated marginal edge.

2. A bake pan comprising a receptacle having outwardly extending, upwardly turned surrounding chamber, a core member having means for resting upon the upturned portion to space the core member uniformly away from the receptacle, and downwardly extending marginal means carried by the core member for producing perforations in the marginal portions of the baked loaf.

3. A bake pan comprising a receptacle and spaced core units, means carried by the receptacle for retaining run over portions from the interval between the units and the receptacle, and means carried by the core units for producing perforations in said run over portion.

In testimony whereof we affix our signatures.

LLOYD R. HUTH.
DAVID E. AHLERS.